G. F. SEDDON.
NUT LOCK.
APPLICATION FILED NOV. 27, 1909.

964,062.

Patented July 12, 1910.

Witnesses.
M. E. Burrell
E. B. Franzoni

Inventor.
George F. Seddon,
By his Attorneys
Baldwin & Wight

UNITED STATES PATENT OFFICE.

GEORGE FARQUHARSON SEDDON, OF HOLBORN, LONDON, ENGLAND, ASSIGNOR TO SOLOMON FORD, OF LONDON, ENGLAND.

NUT-LOCK.

964,062.

Specification of Letters Patent. Patented July 12, 1910.

Application filed November 27, 1909. Serial No. 530,090.

*To all whom it may concern:*

Be it known that I, GEORGE FARQUHARSON SEDDON, architect and surveyor, a subject of the King of Great Britain, residing at 10 Warwick Court, Holborn, in the county of London, England, have invented new and useful Nut-Locks, of which the following is a specification.

This invention relates to nut locks designed to lock a nut securely on a bolt.

According to this invention I place in the threads of the nut a helical spring one end of which is secured to the nut while the other end passes out through a slot cut radially in the nut, the end of the spring projecting slightly beyond the side of the nut.

Figure 1:
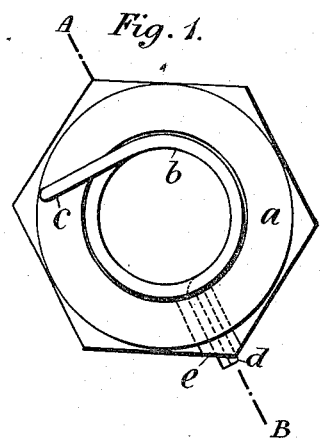
Figure 2:
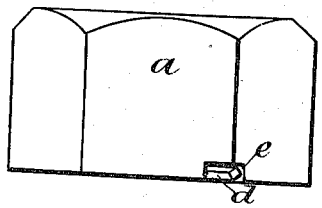
Figure 3:
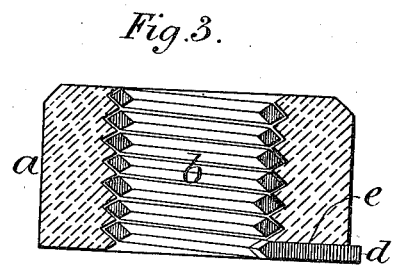
Figure 4:
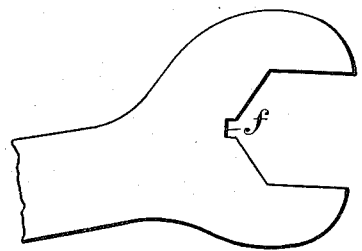

Figure 1 of the accompanying drawings is a plan of a nut made in accordance with this invention; Fig. 2 is an elevation and Fig. 3 a section on the line A—B of Fig. 1. Fig. 4 is a plan view of part of a spanner or wrench which may be used for turning the nut.

In the threads of the nut *a* lies a helical spring *b* one end *c* of which is located in a groove in the top of the nut and is thereby held fast. The other or free end *d* passes out through a radial slot *e* cut in the base of the nut and projects slightly, the slot being slightly wider than the end of the spring so as to allow of movement of such end.

Should the slot be cut at an edge of the nut an ordinary spanner may be used to slack the nut provided it be so put on that the tip of one of its jaws comes against the end *d* of the spring and prevents it from gripping the bolt. But if desired a small nick may be provided in the spanner as shown at *f* in Fig. 4 and the spanner may be so put on that this nick will engage the end of the spring. Or if desired a special washer with such a nick in it may be used to hold the spring while the nut is turned.

What I claim is:—

1. The combination of a nut having a radial slot and a helical spring lying in the threads of the nut and having one end secured to the nut while its other end passes out freely through said slot.

2. The combination of a nut having a relatively wide radial slot and a helical spring coiled in the threads of the nut and having one end secured to the nut while its other end passes out through the radial slot and is free to move therein.

3. The combination of a nut having a radially arranged slot and a helical spring lying in the threads of the nut and having one end secured to the nut while its other end passes out through said slot and extends beyond the face of the nut.

GEORGE FARQUHARSON SEDDON.

Witnesses:
H. D. JAMESON,
F. L. RAND.